April 20, 1965 KARL-HEINZ WÖHNER ETAL 3,179,030
AUTOMATIC DIAPHRAGM FOR PHOTOGRAPHIC CAMERAS
Filed June 28, 1962
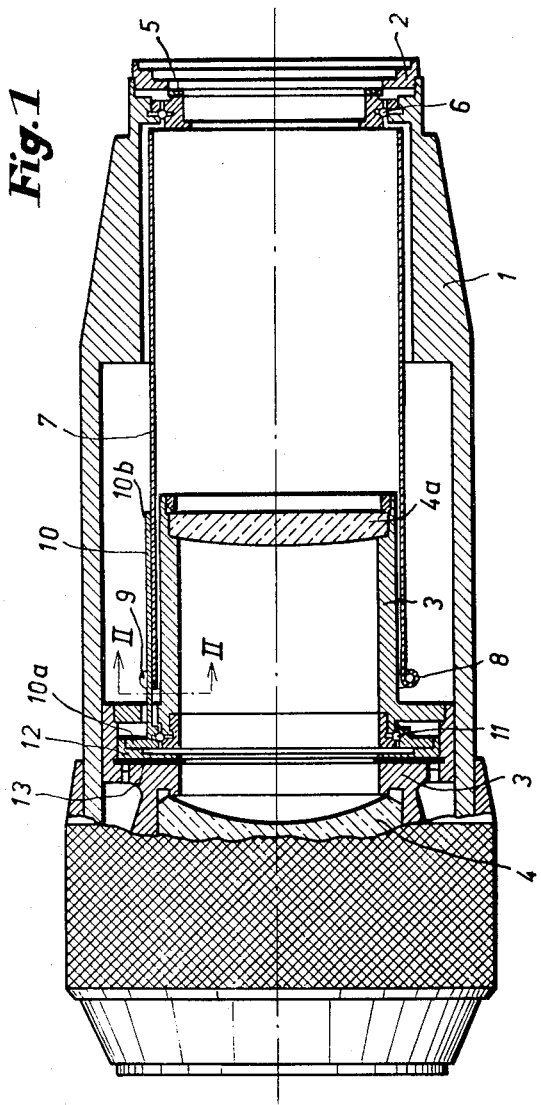
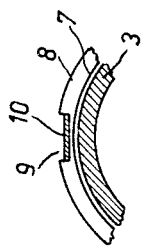
INVENTORS
Karl-Heinz Wöhner
Otto Weiss
BY Singer, Stern & Carlberg,
ATTORNEYS United States Patent Office 3,179,030
Patented Apr. 20, 1965

3,179,030
AUTOMATIC DIAPHRAGM FOR PHOTO-
GRAPHIC CAMERAS
Karl-Heinz Wöhner and Otto Weiss, Wurttemberg, Germany, assignors to Carl Zeiss-Stiftung, doing business as as Carl Zeiss, Heidenheim (Brenz), Germany, a corporation of Germany
Filed June 28, 1962, Ser. No. 206,078
Claims priority, application Germany, July 12, 1961,
Z 8,853
7 Claims. (Cl. 95—64)

This invention relates to automatic diaphragms, particularly for mirror reflex cameras having interchangeable lens systems.

It is customary to provide mirror reflex cameras with interchangeable lens systems having focal lengths up to 135 mm. and to provide these lens systems with automatic diaphragms which are operated and controlled by a mechanism positioned in the camera body. The required diaphragm aperture—when the shutter speed has been selected—is preselected by a manual adjustment of said mechanism or gearing. In mirror reflex cameras the iris diaphragm itself remains fully open during the view finding operation in order to produce a bright viewfinder image. Upon depressing the release member of the camera, the gearing runs down and the diaphragm is adjusted to the preselected size. When this takes place, a coupling projection on the diaphragm operates a diaphragm coupling spring supported by a ball bearing in the camera and rotates a diaphragm tube supported by the same ball bearing. This diaphragm tube is provided with a recess into which engages the cam groove ring of the iris diaphragm which closes the diaphragm to the preselected size. The operation has to be completed within a very short period of time, such as 50 m. sec., since the exposure of the film can take place only after the diaphragm has been adjusted to the correct size, in other words, the iris diaphragm has to snap to the adjusted size. For this reason only objectives having a focal length of 85 mm. or at the most 135 mm. were heretofore provided with automatic diaphragms. In objectives of still longer focal lengths the weight of the tubes and other parts which operate the iris diaphragm is too great and the diaphragm adjustment cannot take place quickly enough. Furthermore, in objectives of long focal length the path of the focussing adjustment between close-up pictures and infinity is very long and this leads to constructive difficulties.

It is an object of the invention to provide a dependable and satisfactorily operating automatic diaphragm, particularly for objectives having a long focal length.

This and other objects of the invention will be described in connection with a specific embodiment which is illustrated in the accompanying drawing, in which:

FIG. 1 is a side elevation view of a camera objective, partly in axial section, provided with an automatic diaphragm of the invention, and FIG. 2 is a detail section view along the line II—II of FIG. 1.

Referring to the drawing, a tubular main mount part 1 of the interchangeable camera objective is provided at its rear end with means such as a mounting ring 2 for attaching the objective to a camera body. The front end of the tubular main mount part 1 carries the adjustable objective mount 3 within which is arranged a lens system 4 and an iris diaphragm 13. A diaphragm coupling spring 5 is arranged within the rear end of the part 1 and is rotatably supported therein by a ball bearing 6. The ball bearing 6 also supports rotatably a very thin walled diaphragm tube 7 which is arranged concentrically within the tubular main mount part 1 and extends close to the iris diaphragm 13 in the adjustable objective mount 3. The weight of the tube 7 is very small but its rigidity is substantial. The outermost or forward end of the tube 7 is provided with an outwardly rolled bead 8 which is provided with a recess 9 for accommodating a bar-like diaphragm operating member 10 consisting of a narrow strip of metal extending lengthwise along the outer circumference of the tube 7. The length of the member 10, which is also light in weight but very rigid, corresponds to the pitch or axial displacement of the lens system 4, 4a. One end of the operating member 10 is attached to a carrier ring 10a which is concentrically mounted by means of a ball bearing 11 within the axially adjustable lens mount 3. The rear end of the mount 3 with the lens 4a therein extends into the front end of the tube 4. The mount 3 in turn is axially adjustably mounted in the front end of the stationary tubular main mount part 1. The ring 10a is attached to the cam-slot ring 12 of the iris diaphragm 13 so that upon a rotative movement of the ring 10a the ring 12 is also rotated and adjusts the diaphragm aperture.

When the release member of the photographic camera is actuated, a gearing or other mechanism coupled with the diaphragm operating mechanism is operated and the automatic diaphragm is adjusted to a preselected value. In this operation the coupling spring 5, which is supported by the ball bearing 6, is rotated and at the same time the tube 7 is rotated which is rotatably supported by the same ball bearing 6. The tube 7 in turn actuates the diaphragm operating member 10 and the latter rotates the rings 10a and 12 so that the diaphragm 13 is adjusted to the preselected aperture. The weight or the mass of the actuated parts is so small and the movability of these parts is so easy that the entire operation, even in camera objectives having a focal length of 250 mm. or more, requires less than 50 meters per sec.

During the adjustment of the objective to different distances of objects to be photographed, the distance of the ball bearing 11 from the picture plane in the camera changes, or in other words, the lengthwise extending diaphragm operating mmeber 10 engages the recess 9 in the bead 8 along different portions of its length when the member 10 is moved lengthwise into the tubular main mount part 1. However, even when the lens system is adjusted for short distances, such as close-ups, i.e. when the member 10 engages with its outermost end 10b the recess 9, the desired short adjusting time for the diaphragm 13 is obtained with accuracy and dependability.

What we claim is:

1. An automatic diaphragm, particularly for photographic objectives having a long focal length, and including in a tubular main mounting part which is adapted to be attached to a camera body, a coupling member which is adapted to be operatively coupled with a diaphragm preselecting means in the camera body, an adjustable objective mount on the outer end of said tubular mounting part arranged for longitudinal sliding movement, an iris diaphragm in said adjustable objective mount and arranged at a considerable axial distance from said coupling member, a rotatably mounted cam-groove ring for said diaphragm for adjusting the aperture of said diaphragm, a movement transmitting means between said coupling member and said cam-groove ring comprising a thin walled rigid tube extending lengthwise within said tubular main mount part, and a longitudinally extending bar associated with said cam groove ring slidably connected to said thin walled rigid tube for operatively and slidably connecting said coupling member with said cam-groove ring.

2. An automatic diaphragm, particularly for photographic objectives having a long focal length, and including in a tubular main mounting part which is adapted to be attached to a camera body, a coupling member which is adapted to be operatively coupled with a diaphragm preselecting means in the camera body, an adjustable objective mount on the outer end of said tubular mounting part arranged for longitudinal sliding movement, an iris diaphragm in said adjustable objective mount and arranged at a considerable axial distance from said coupling member, a rotatably mounted cam-groove ring for said diaphragm for adjusting the aperture of said diaphragm, a movement transmitting means between said coupling member and said cam-groove ring comprising a thin walled rigid tube extending lengthwise within said tubular main mount part, a longitudinally extending bar associated with said cam groove ring slidably connected to said thin walled rigid tube for slidably and operatively connecting said coupling member with said cam groove ring, one end of said tube being rotatably supported by a ball bearing assembly which also rotatably supports said coupling member having the form of a ring arranged concentrically within said tubular main mount part.

3. An automatic diaphragm, particularly for photographic objectives having a long focal length, and including in a tubular main mounting part which is adapted to be attached to a camera body, a coupling member which is adapted to be operatively coupled with a diaphragm preselecting means in the camera body, an adjustable objective mount on the outer end of said tubular mounting part arranged for longitudinal sliding movement, an iris diaphragm in said adjustable objective mount and arranged at a considerable axial distance from said coupling member, a rotatably mounted cam-groove ring for said diaphragm for adjusting the aperture of said diaphragm, a carrier ring for said cam groove ring, a movement transmitting means between said coupling member and said carrier ring for said cam-groove ring comprising a thin walled rigid tube extending lengthwise within said tubular main mount part, one end of said tube being rotatably supported by a ball bearing which also rotatably supports said coupling member having the form of a ring arranged concentrically within said tubular main mount part, a longitudinally extending operating member on said carrier ring, the other end of said member being operatively and slidably connected to said tube and being engageable in a peripheral notch therein, said longitudinally extending operating member being adapted to slide in said notch when the adjustable objective mount is moved longitudinaly to focus said camera without disturbing the diaphragm.

4. An automatic diaphragm, particularly for photographic objectives having a long focal length, and including in a tubular main mounting part which is adapted to be attached to a camera body, a coupling member which is adapted to be operatively coupled with a diaphragm preselecting means in the camera body, an adjustable objective mount on the outer end of said tubular mounting part arranged for longitudinal sliding movement, an iris diaphragm in said adjustable objective mount and arranged at a considerable axial distance from said coupling member, a rotatably mounted cam-groove ring for said diaphragm for adjusting the aperture of said diaphragm, a rotatable carrier ring drivingly connected to said cam groove-ring, and a movement transmitting means between said coupling member and said carrier ring comprising a thin walled rigid tube extending lengthwise within said tubular main mount part, one end of said tube being rotatably supported by a ball bearing which also rotatably supports said coupling member having the form of a ring arranged concentrically within said tubular main mount part, the other end of said tube being provided with a bead having a recess therein, a longitudinal bar-shaped coupling member on said carrier ring extending lengthwise of said tube and slidably received in said recess to transmit motion from said rigid tube to said carrier ring, said carrier ring being positioned adjacent and in driving connection with said cam-groove ring to drive the latter when said tube is rotated without destroying the longitudinal focus position of said adjustable objective mount.

5. An automatic diaphragm, particularly for photographic objectives having a long focal length, and including in a tubular main mounting part which is adapted to be attached to a camera body, a coupling member which is adapted to be operatively coupled with a diaphragm preselecting means in the camera body, an adjustable objective mount on the outer end of said tubular mounting part arranged for longitudinal sliding movement, an iris diaphragm in said adjustable objective mount and arranged at a considerable axial distance from said coupling member, a rotatably mounted carrier ring in said adjustable lens mount, a rotatably mounted cam-groove ring in said lens mount for said diaphragm for adjusting the aperture of said diaphragm, a movement transmitting means between said coupling member and said carrier ring comprising a thin walled rigid tube extending lengthwise within said tubular main mount part, a ball bearing assembly rotatably supporting one end of said tube, said ball bearing assembly being adapted to rotatably support said coupling member, said coupling member being in the form of a ring arranged concentrically within said tubular main mount part, a longitudinal bar-shaped coupling tongue extending longitudinally of said tube with one end connected to said carrier ring, the other end of said tube being provided with a bead having a recess therein for slidably receiving said bar-shaped coupling tongue, said carrier ring being drivingly connected with said cam-groove ring to drive the latter when said tube is rotated, said carrier ring and said cam-groove ring being rotatably supported in said adjustable lens mount by a common ball bearing, said adjustable lens mount being axially and adjustably supported on the end of said tubular main mount part.

6. An automatic diaphragm in accordance with claim 5, in which the length of said bar-shaped coupling member is at least equal to the length of the axial adjustability of the lens system in said adjustable lens mount.

7. An automatic diaphragm in accordance with claim 5, in which a portion of said adjustable lens mount extends into one end of said tube.

References Cited by the Examiner
UNITED STATES PATENTS

| | | | |
|---|---|---|---|
| 2,411,777 | 11/46 | Czarnikow | 95—64 |
| 2,907,257 | 10/59 | Schiks | 95—64 |

FOREIGN PATENTS 1,101,135    3/61    Germany.

NORTON ANSHER, *Primary Examiner.*

EMIL G. ANDERSON, *Examiner.*